H. FULLER & T. L. BOYD.
Sulky-Plows.
No. 198,100.  Patented Dec. 11, 1877.
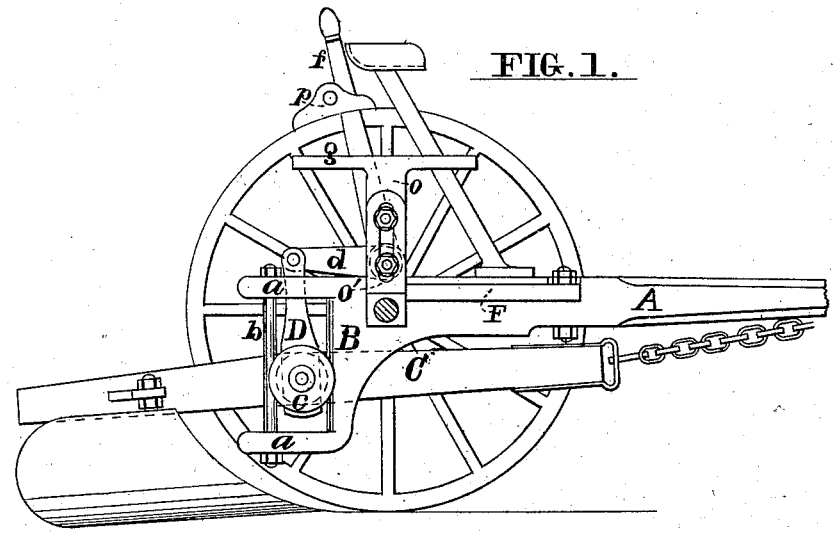
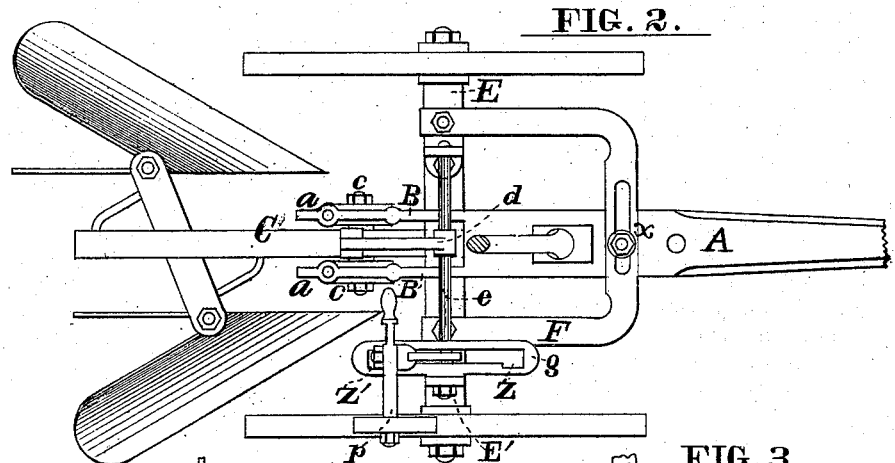
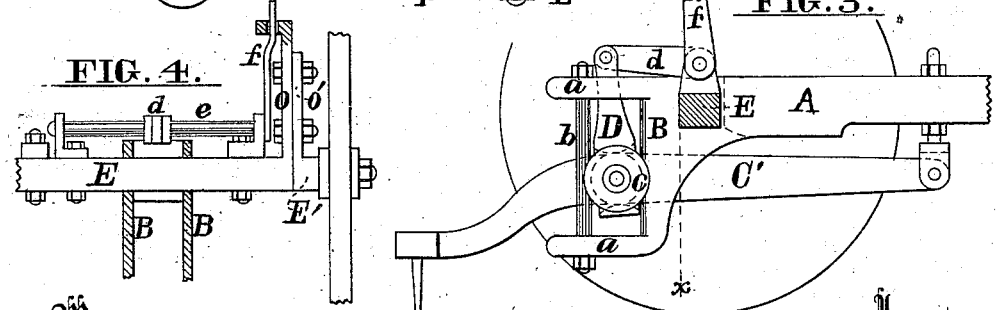
Witnesses
John A. Trimble
Inventors
Henry Fuller
Thomas L. Boyd
By Peck & Hosea their Attorneys

UNITED STATES PATENT OFFICE.

HENRY FULLER AND THOMAS L. BOYD, OF FRANKLIN, OHIO.

IMPROVEMENT IN SULKY-PLOWS.

Specification forming part of Letters Patent No. 198,100, dated December 11, 1877; application filed June 5, 1877.

*To all whom it may concern:*

Be it known that we, HENRY FULLER and THOMAS L. BOYD, of Franklin, in the county of Warren and State of Ohio, have invented a new and useful Improvement in Sulky or Wheel Plows; and we do hereby declare the following to be a full, clear, and exact description thereof, reference being had to the accompanying drawings, and to the letters of reference marked thereon.

Figure 1 represents a side elevation of our invention, with one wheel and a portion of the axle removed. Fig. 2 is a vertical plan view of same. Fig. 3 represents a detailed side elevation of the plow-carriage, showing a rake attached. Fig. 4 represents a portion of an end elevation of the plow-carriage, showing the plates B in section.

Our present invention consists in certain improvements in the construction and combination of the principal features of the sulky-plow for which a patent was granted to us January 30, 1877, as hereinafter particularly described.

In the drawings, A denotes the tongue, upon the sides of which plates B are secured and extend rearward, terminating in arms $a$ $a$, united by bolts $b$ $b$, forming yokes or guides for the friction-wheels $c$ $c$, which are connected with a shaft passing through them, and serving as a pivot for the plow-beam C, and also passing through an arm, D, which is slotted at its lower end to admit the plow-beam C. The arm D has its upper end pivoted to the lever $d$, which may be adjustably fastened to the shaft $e$, to which the hand-lever $f$ is rigidly attached for elevating the plow. The carriage-axle E E' is inserted through the frame-plates B B, and the bracing-frame F, connected with the axle by bolts, is slotted where the bolt $x$ secures it to the tongue.

By these means of connecting the tongue and its plates B B to the axle, lateral adjustment of the plows is provided for.

The axle is constructed in two parts, E E', each of which has a corresponding vertically-projecting slotted arm, $o$ $o'$, which are connected together adjustably by bolts and nuts, as clearly shown in Figs. 1 and 4, for the purpose of adjusting the relative positions of the wheels vertically. The upper end of the hand-lever $f$ extends through the horizontal plate $g$ attached to the top of the vertical arm $o$, and the recesses $z$ $z'$ are provided to receive the hand-lever $f$ and retain the plow in an elevated or depressed position. A brake-lever, $p$, pivoted to the hand-lever $f$, and operating a brake-shoe upon the adjacent wheel, is provided to aid in elevating the plow-beam, when required.

In using heavy plows, we apply the draft directly to the plow-beam C; but when a rake is used, or when using the carriage with cultivators, the beam C' may be pivoted to the tongue by a vertical bolt, as shown in Fig. 3.

Having fully described our invention, we claim as new—

The frame, consisting of the plates B, guides $b$, and tongue A, in combination with the pivot provided with grooved rolls $c$, upon which the plow-beam C works, substantially as described.

Witness our hands this 17th day of April, A. D. 1877.

HENRY FULLER.
T. L. BOYD.

Witnesses:
H. P. K. PECK,
L. M. HOSEA.